(12) United States Patent
Bodnar et al.

(10) Patent No.: US 6,310,878 B1
(45) Date of Patent: Oct. 30, 2001

(54) LARGE PACKET SWITCH ROUTER

(75) Inventors: Bohdan Lew Bodnar, Park Ridge; James Patrick Dunn, Northfield Township, LaSalle County; Conrad Martin Herse; Enn Tammaru, both of Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/124,874

(22) Filed: Jul. 30, 1998

(51) Int. Cl.[7] ................................................... H04L 12/56
(52) U.S. Cl. ............................................ 370/396; 370/376
(58) Field of Search ..................................... 370/376, 386, 370/389, 392, 396, 397

(56) References Cited

U.S. PATENT DOCUMENTS 5,473,598 * 12/1995 Takatori et al. .
5,831,970 * 11/1998 Arao ..................................... 370/227
6,078,963 * 6/2000 Civanlar et al. ...................... 709/238

* cited by examiner

Primary Examiner—Douglas Olms
Assistant Examiner—Ken Vanderpuye
(74) Attorney, Agent, or Firm—Werner Ulrich

(57) ABSTRACT

A large router for routing datagrams. The large router comprises a plurality of router slices, each of which receives switches and transmits datagrams. Each router slice has a routing memory for routing the packets. If a packet is received whose destination address is not known to the receiving packet slice, the packet slice broadcasts a request for routing information for that datagram to the other packet slices of the large router and routes the packet in accordance with the received responses. Groups of slices are interconnected by a time slot interchange (TSI) unit, and groups of TSIs are interconnected by a time multiplexed switch. The router can consist of more than one switch; the switches being interconnected by high speed data links. Advantageously, the router, though composed of small slices, acts as if it were a single large high capacity entity.

8 Claims, 5 Drawing Sheets

LARGE PACKET SWITCH ROUTER

TECHNICAL FIELD

This invention relates to apparatus and methods for implementing a large high capacity packet switch (Router).

Problem

An Internet Protocol (IP) Router is a packet switching system which switches packets toward a destination specified by an IP header. It is desirable to have a very large router in order to switch from a large number of sources toward a large number of intermediate and final destinations in order to minimize the number of intermediate nodes through which a typical IP packet is routed. Minimizing the number of these nodes reduces the cost of a system and reduces the delay in transmitting IP datagrams (packets) from source to destination.

FIG. 1 illustrates the basic operation of prior art routers. The network access link nodes 1 provide the external input/output for the router. Each of the link nodes has local intelligence in a program controlled processor 6, and a local routing table 5. This table is stored in a cache. The entire routing table for the router is maintained in a centralized routing table database 4 comprising a database server 7. The (routing) operation of this router is as follows:

1. A datagram arrives via a network interface 2 (e.g., a frame relay connection), and its IP (destination) address is searched for in the local routing table.
2. If the entry is found, the datagram is routed. Note that the outbound physical connection, which may be to the destination node or to an intermediate node, must be on the same link node.
3. If the entry is not found, the datagram's destination IP address is sent to the centralized routing table database node and a search is made there. If the link node which received the incoming datagram has a physical connection to the appropriate outbound path, the datagram's IP address is returned together with necessary routing table updating information. From now on, the updated link node will autonomously route datagrams with this same destination IP address unless this information is removed from the cache.
4. If routing information is not available, the datagram is sent to another router (the "default router").

Solution

Applicants have recognized that the architecture shown in FIG. 1 is fairly simple to implement, and within limits, is efficient. It has, however, some performance-rated limitations. A partial list of these limitations is the following:

1. Each link node has a limited physical addressing capability. A datagram coming in on one link node cannot be readily routed to another; although external datagram links could be incorporated, the added connectivity would soon become cost-prohibitive.
2. Under certain types of heavy load, (e.g., traffic entering a node and terminating to many random destinations), the centralized routing table database node and/or the bus connecting it to the link nodes will become a performance bottleneck. Thus, high delays could be incurred. This type of operation would be unacceptable for real-time applications (e.g., Internet telephony).

A problem of the prior art is that there is no good architecture available for a large router.

The above problem is solved and an advance is made over the prior art in accordance with our invention wherein a "large router" is implemented by spreading the control among a plurality of routing "slices" (units); each slice is a small, stand-alone router which can either operate autonomously or cooperatively with other slices; in the latter case, taken together, the slices form a scalable router. High bandwidth interconnections available, for example, in the 5ESS Switch® manufactured by Lucent Technologies, Inc., ensure that datagrams can be readily routed between the slices; thus, a datagram entering one slice can leave on another. One way of obtaining external routing connections in a 5ESS® switch is via the TSI.

In one preferred embodiment, a plurality of routing slices together forms a routing module. In this preferred embodiment, the routing module has a single overall controller, a switching module processor. The routing slices are interconnected within a time slot interchange (TSI) unit. A plurality of modules forming a single larger router has the TSIs of the individual modules interconnected by a time multiplexed switch in a communications module. Advantageously, this arrangement allows for the flexible interconnection of a plurality of routing modules to form a very much larger router.

In accordance with one feature of Applicants' invention, individual router slices can be interconnected by a direct high speed interconnection and advantageously, such an arrangement can remove substantial load from the TSI of the interconnected slices. This feature can further be used to interconnect router slices on different switches, thus allowing a large amount of traffic to cross switch boundaries efficiently thereby making it possible for a plurality of switches to act effectively as a single large router.

DETAILED DESCRIPTION

Figure 2:
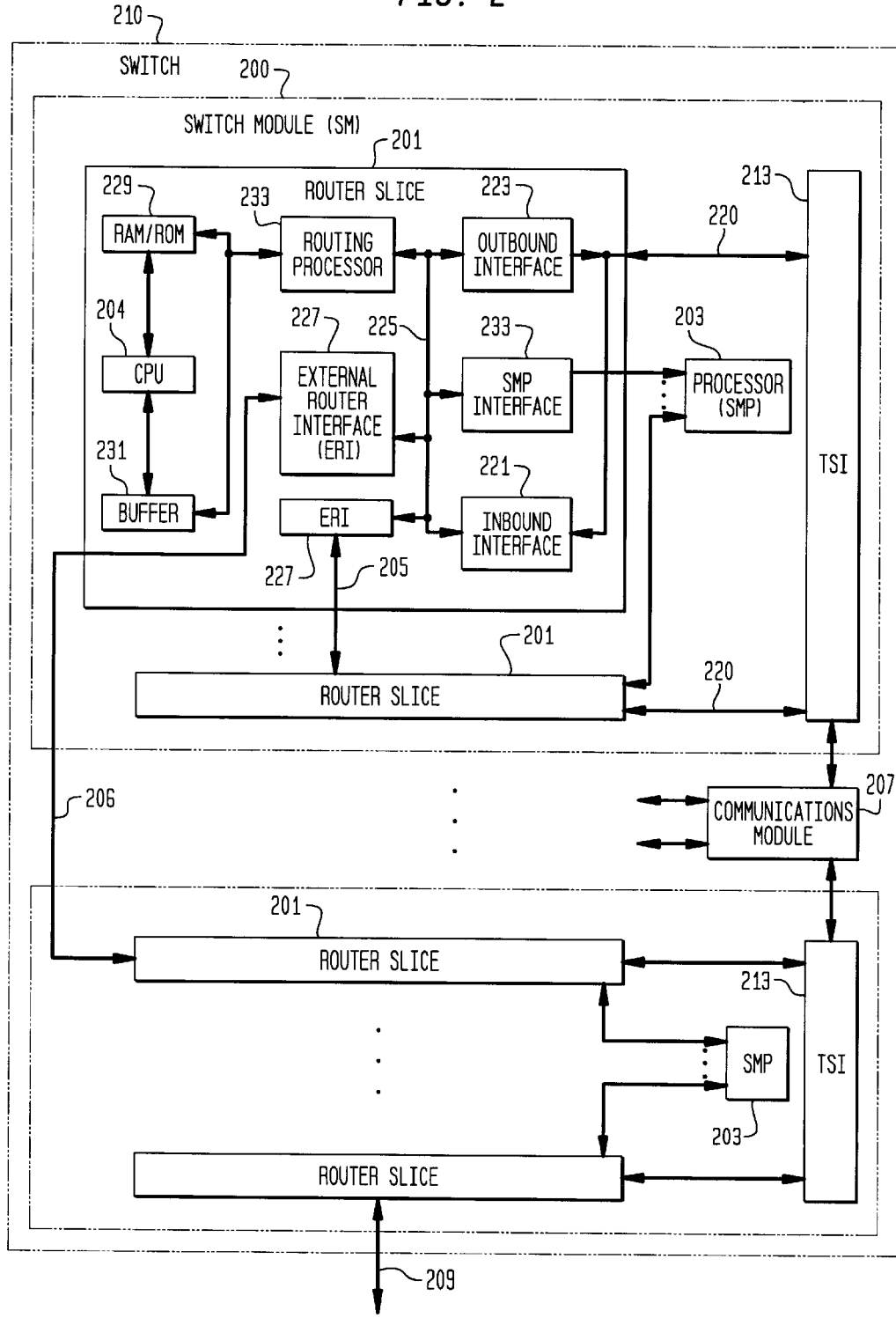
FIG. 2 is a block diagram of a router in accordance with Applicant's invention.

The large router eliminates centralized router problems by distributing the routing table among the slices (no centralized table need be maintained) and by relying on the ubiquitous link interconnection of a large digital switch such as the 5ESS ® switch. FIG. 2 shows the architectural view of a portion of the large router. Although only two slices 201 are shown within one switching module 200, the reader should note that multiple interconnections between router slices and non-router slices of a TSI unit exist; in this example, the interconnections are via the TSI(s) of the switch and via an internal high speed data link 205, such as an ATM link. Upon initialization, a default routing table is loaded into a database of a processor 204 for controlling each slice. Additionally, for greater speed, specialized hardware can be used for directly routing the datagrams; this hardware works directly off the database. The slices can become cognizant of each other's presence either via a centralized control (for example, in the 5ESS®, the Communication Module Processor (CMP) can hold global information about the slices), or via distributed control (for instance, each slice can broadcast messages periodically requesting information as to which other slices reside in the large router). Alternatively, slices can become aware of each other only on demand, for instance, if a datagram arrives and a slice wants to know whether any other slices exist which know about the destination for this datagram. Finally, the slices can form, a "community of interest router"; that is, some slices could form one large router, some others could form another, and so forth. Stated differently, multiple routers could be constructed within a 5ESS® Switch.

An SMP, (Switching Module Processor), 203 can control one or more slices of a switching module 200. These slices can be cognizant of each other, but need not be. In the former case, the slices form a portion of a large (distributed) router whereas in the latter, multiple smaller routers can be formed inside a single switching module (SM) 200 or inside a single switch 210. The concept can be extended beyond a single switch with a single, or multiple large routers spanning multiple switches.

If the slices communicate with each other inside an SM, a multiplicity of communication mechanisms can be used either independently or concurrently:

Paths can be formed inside the TSI for intra-SM slices to communicate with each other.

The slices can communication via an external data highway 205, 206 or 209, (i.e., SONET ring, ATM, etc.).

Both mechanisms can be used, with the internal load balancing logic determining which communication path is "optimal" at the moment one slice needs to communicate with another one.

The use of multiple interslice communication paths ensures low datagram delays when datagrams are sent from one slice to another, low delays in on-demand routing table updates, and an increase in reliability. (Should one path fail, the dynamic load balancing mechanism will naturally route datagrams, supervisory information, and so forth via the remaining paths).

In this preferred embodiment, each switch module has one TSI 213. This TSI serves to interconnect the router slices with each other and external facilities. The TSIs of different switch modules 200 within a switch 210 interconnected by communications module 207 which in the preferred embodiment, is a space division switch (time multiplexed switch).

In this preferred embodiment, the standard TSI and CM interconnections are augmented by direct interconnections between router slices 201. Shown on FIG. 2 are three such interconnections; an intra-module interconnection 205, an inter-module interconnection module 206, and an inter-switch interconnection 209. These high speed direct interconnections relieve bottlenecks in the TSI and CM, or in the case of interconnection 209, inter-switch facilities.

FIG. 2 shows details of one of the router slices 201. An inbound interface 221 receives inputs over bus 220 from TSI 213 and passes these inputs on to a common high speed bus 225, and the high speed bus feeds outputs over bus 220 to the TSI via an outbound interface 223. The external router interface 227 interconnects the high speed bus 225 with one of the inter-slice links 205 and 206. The router slice is controlled by central processing unit (CPU) 204 which has access to routing information stored in Random Access Memory/Read Only Memory 229, and which has access to the contents of datagrams stored in buffer 231. In the preferred embodiment, the "ROM" is an electrically erasable programmable read only memory (EEPROM) such as the FLASH® memory manufactured by Intel, so that even the contents of the "ROM" can be changed. A high speed routing processor 233, the previously mentioned specialized hardware for routing, controls the loading and unloading of buffer 231 based on the routing information stored in RAM/ROM 229. Overall control of the router slice is provided by switching module processor 203 which controls all the router slices in switch module 200. SMP 203 communicates with CPU 204 via an SMP interface 235. For mass updating of the memories 229, a direct link to SMP Interface 235 can be used, but this is not normally used during operation of the router.

Figure 3:
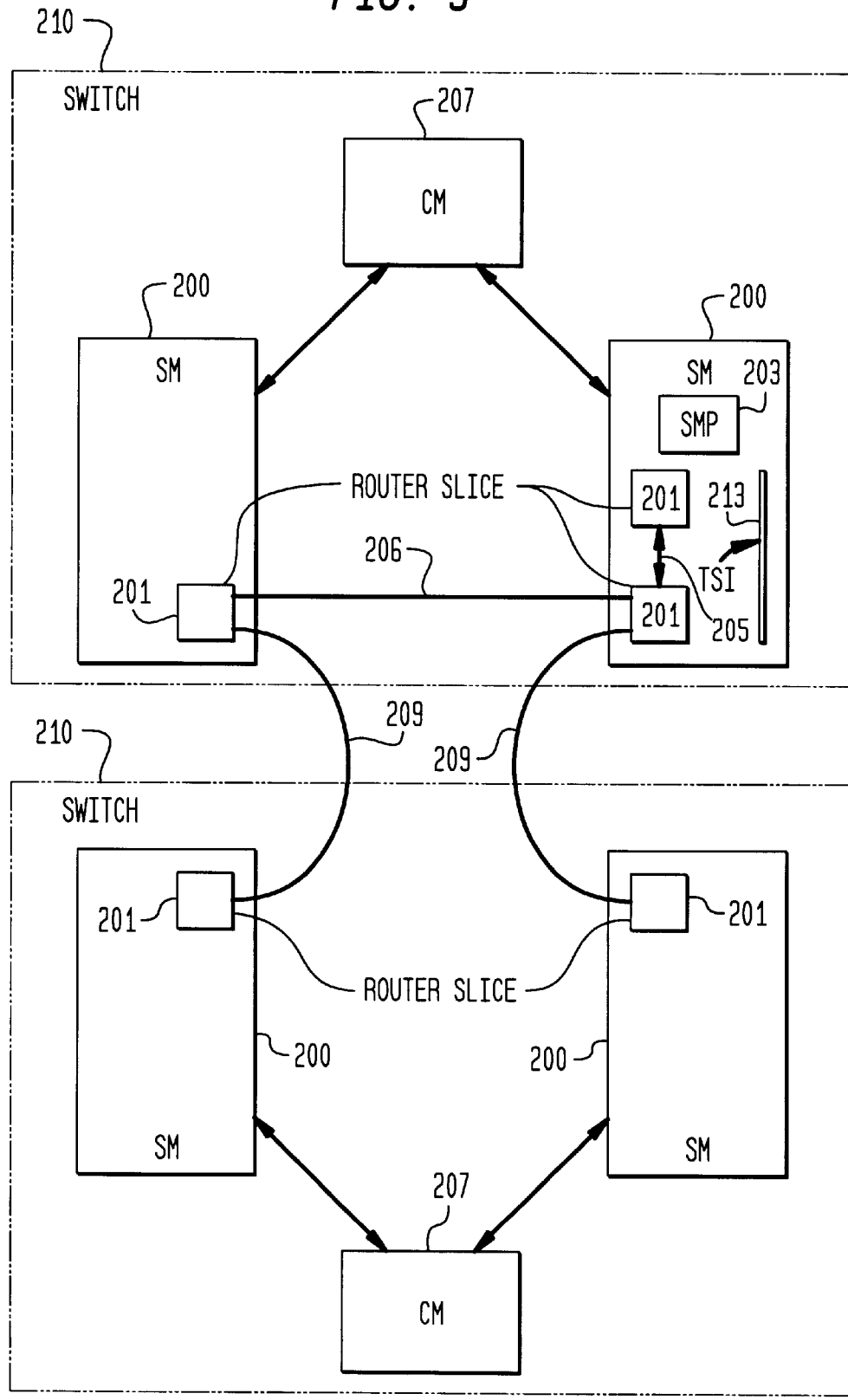
FIG. 3 is a block diagram illustrating various techniques for expanding the size of Applicant's router.

FIG. 3 shows a two switch large router. Data flows between the two switches over inks 209 which can be very high speed links such as optical links. Router slices on different modules are interconnected by high speed links 206, as well as the communication module 207. In some cases, slices on the same switching module are interconnected by a local high speed link 205. The object of the arrangement shown in FIGS. 2 and 3 is to create a plurality of entities which appear from the outside to be single large routers.

Figure 4:
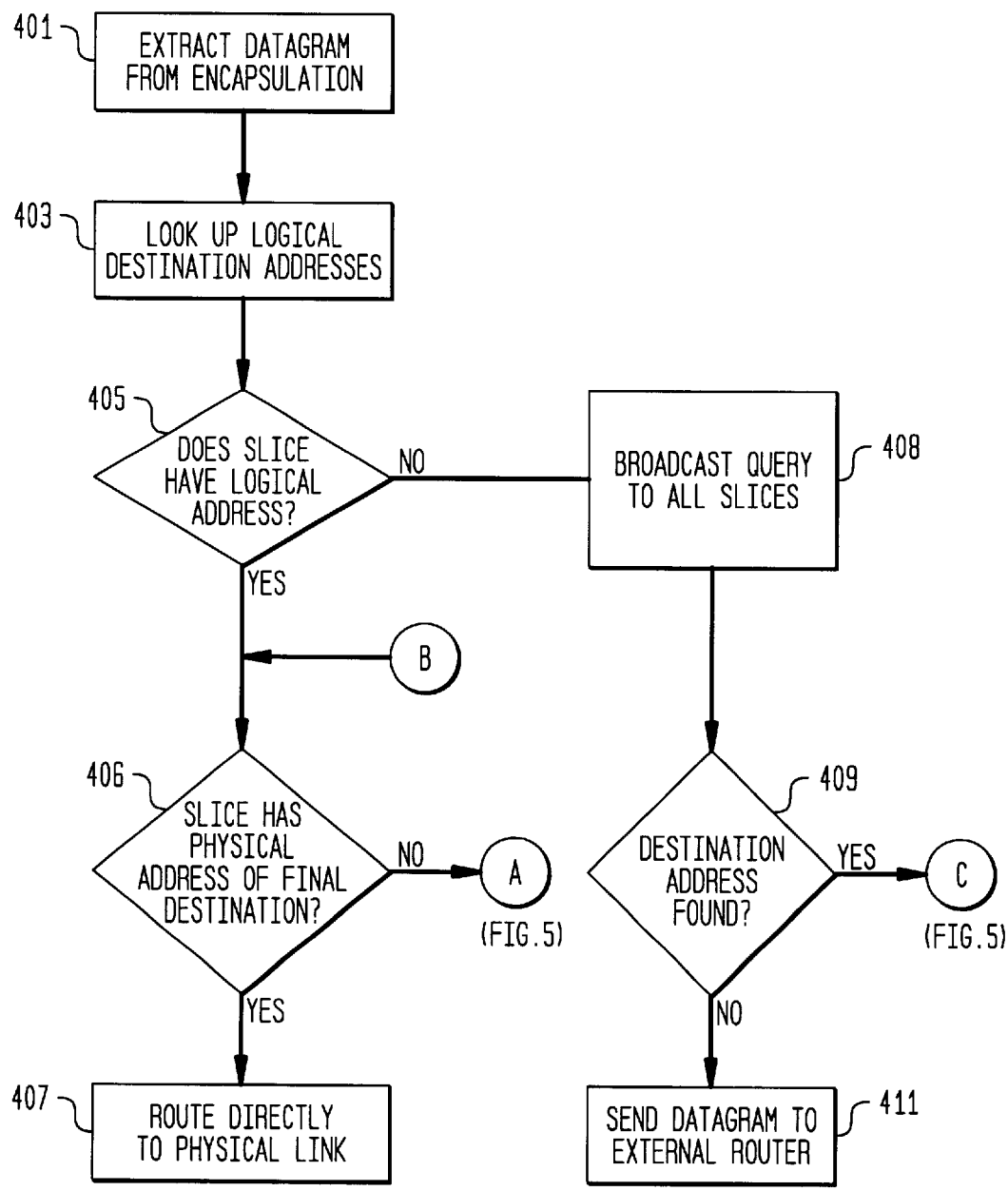
FIGS. 4 and 5 are a flow diagram of a method of utilizing a larger router.
Figure 5:
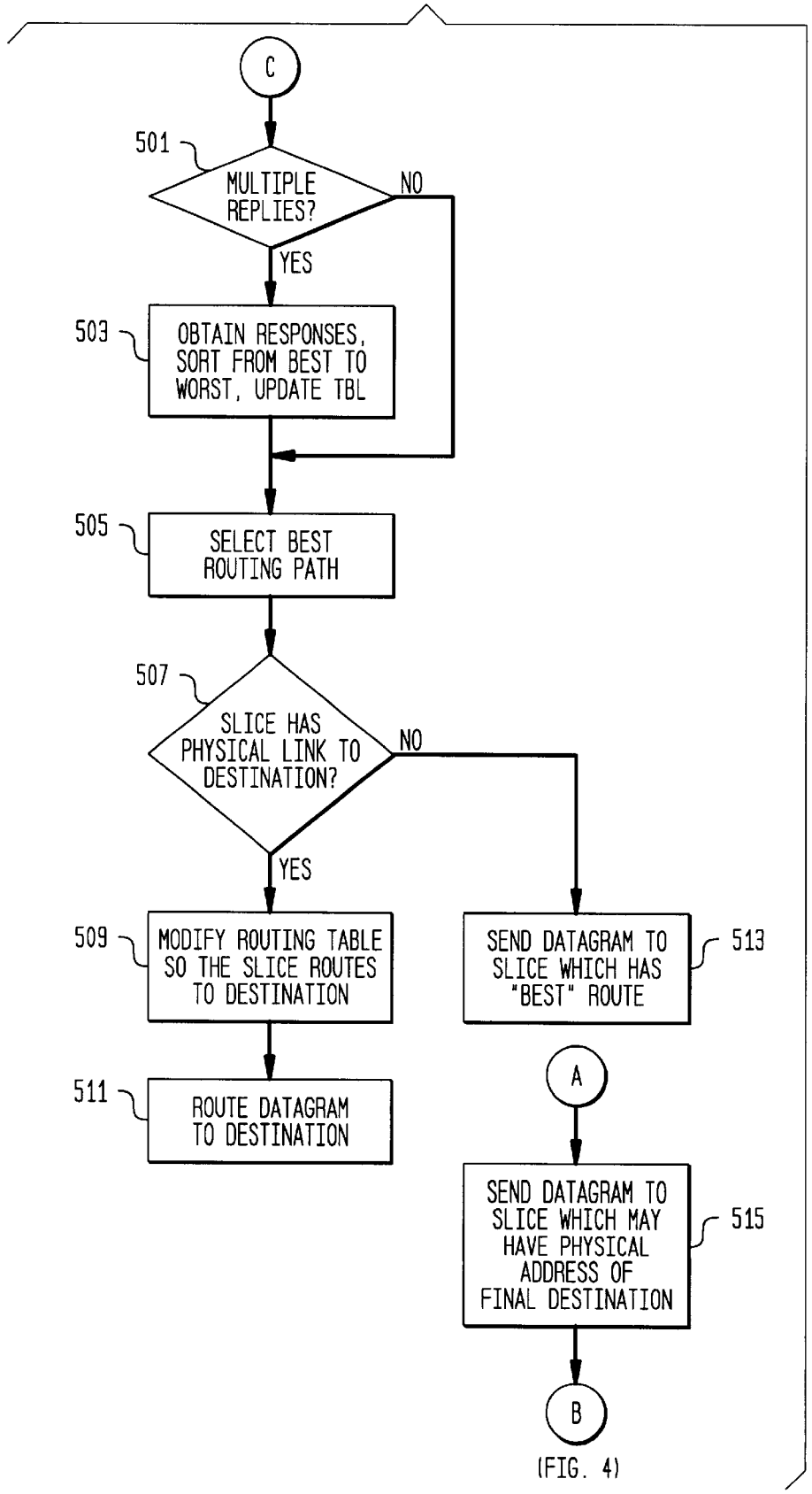

The method of exploiting such large routers is illustrated in FIGS. 4 and 5. A slice receives a datagram (Action Block 400, FIG. 4). The slice extracts the datagram from encapsulation information such as the cyclic redundancy check (Action Block 401). The slice looks up the logical destination address in its own memory (Action Block 403). Test 405 is then used to determine whether the slice has the logical address. If the slice has the logical address, test 406 determines if the slice is directly connected to the destination. If the slice is directly connected to the destination, the datagram is routed directly to the connecting physical link (Action Block 407). If the slice is not directly connected (negative result of test 406), the datagram is routed to another slice which may have the physical address of the final destination (Action Block 515). Test 406 is then re-entered, and eventually, Action Block 407 will be executed. If the routing slice does not have the logical address of the destination stored in its routing memory, the routing slice broadcasts an address query to all of the slices of the large router to which the routing slice belongs (Action Block 407). Test 409 is then used to determine whether any responses to the query have indicated that the destination logical address has been found. If not, the datagram is sent to a default external router (Action Block 411). If at least one positive reply has been received, then Test 501, (FIG. 5), is used to determine whether a single reply was received or multiple replies. If multiple replies have been received, then these replies are sorted from best to worst, and the routing table is updated (Action Block 503). Action Block 505 which follows the negative result of Test 501 or the completion of Action Block 503, selects the best routing path. Several criteria can be used in making this selection:

1. A short delay in the routing slice which has the logical destination address in its routing table is preferred over a long delay.
2. A routing slice that is directly connected to a destination router is preferred over a routing slice which is connected via an intermediate router.
3. A routing slice having lower traffic load is preferred to a routing slice having a high load.

The rating of these criteria will be based on field experience. Extremes in any of these criteria are likely to lead to the rejection of the extreme case as the "best" routing path. The sorted results are stored sot hat the next routing attempt can be handled more efficiently. Test 507 is used to determine whether the slice has a direct physical link to the destination. If the slice has such a physical link, then the routing table of the slice is modified to store this link so that subsequent datagrams for the same destination will be found in the routing table of this slice (Action Block 509), and the datagram is routed to its destination (Action Block 511). If the slice does not have the physical link to the destination (negative result of Test 507), then the datagram is sent to the slice which has the best route (Action Block 513).

Figure 1:
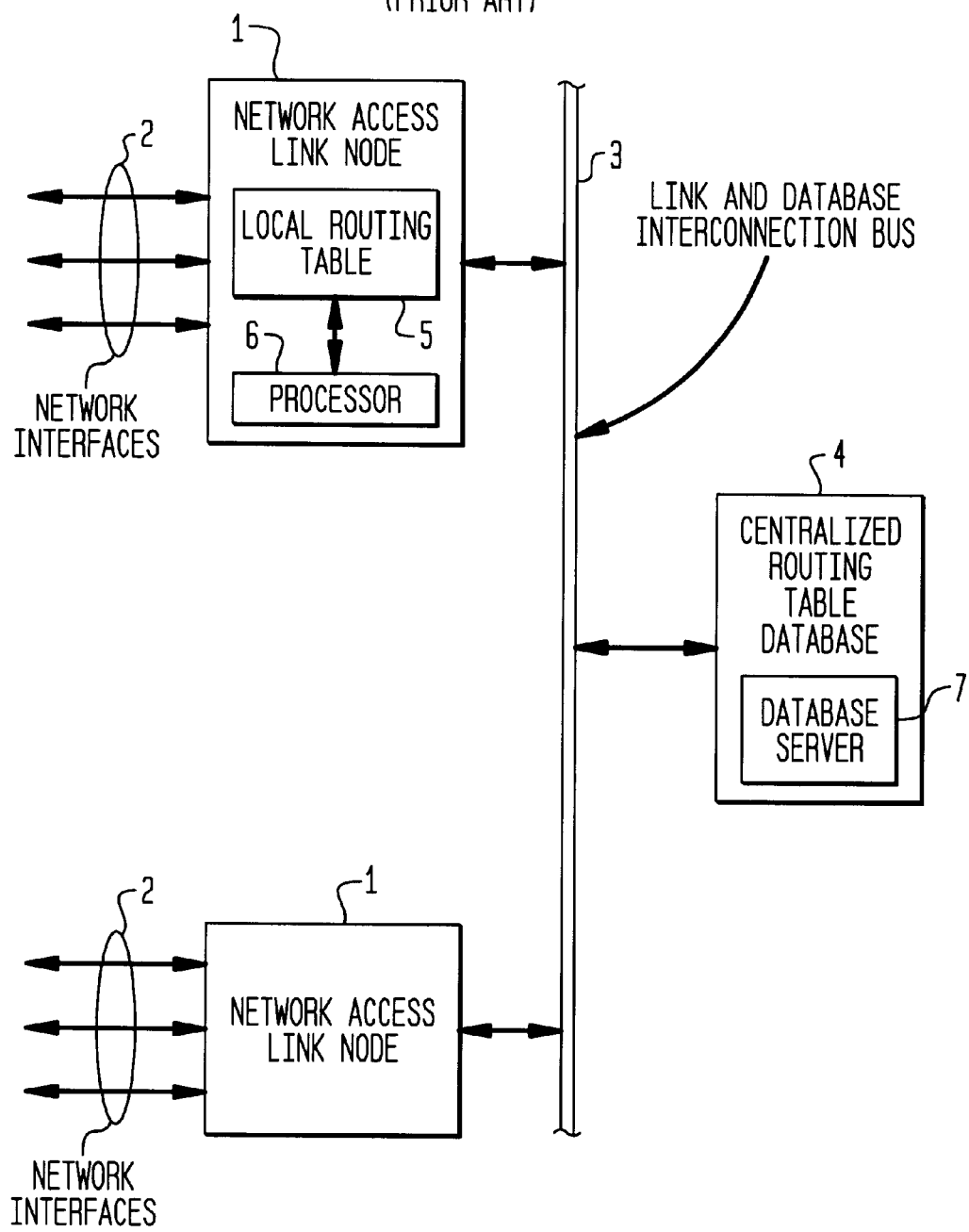
FIG. 1 is a prior art arrangement for increasing the size of a router.

The large router offers several advantages over the architecture shown in FIG. 1:

1. Distribution of the routing table over many slices allows the large router to use routing tables of a large size. Components of this table are exchanged, on demand, among the slices. For example, if a slice receives a datagram for which it has no routing information, it can query (via a broadcast message) all the other slices for the routing information. While the default routing tables can be stored in the SMP (203), the entire routing table can be stored in, say, a processor of the CM (or other central location) and a slice (or slices) could be used to initialize the rest of the large router.
2. There is no bottleneck in accessing routing information from a central source.
3. A multiplicity of interconnections among the slices allows dynamic load balancing. For example, as stated above, a slice can query all other slices in the large router for routing information it does not have. If multiple slices respond (that is, there are multiple paths to the destination), the query-originating slice can sort the responses in terms of quality-of-service (QoS) and determine the"optimal" path to the outbound destination link.
4. The large router has a high fault tolerance— information about out-of-service outbound links or about slices can be used to determine the"optimal" path since malfunctioning links or slices will result in a (dynamic) reconfiguration of the"optimal" paths between slices.
5. The large router can be distributed across several 5ESS® Switches with several high-speed interconnections among the slices. Thus, although the large router appears to be a single monolithic entity, it can be physically distributed.
6. A datagram entering the router at any slice can be routed to any other slice via several data links; thus, an enhancement in physical connectivity is created. Should several slices have the physical destination connectivity, the large router can, via dynamic load balancing, choose the optimal internal route. The enhancement of physical connectivity and the large router's capability of dynamically reconfiguring its internal data paths increases the systems reliability by providing a large number of alternate routing paths.

One can see, therefore, that the large router principles offers the capability of creating a router of arbitrary size capable of using, in a distributed manner, routing tables of extremely large size. The performance limitations of this router are limited only by connectivity bandwidth and local processing power. (For instance, if slice's routing is done via custom hardware instead of software, a slice can then access more Internet links, use a larger routing table, etc.). The internal load-balancing not only can be used to enhance performance, but also provides fault tolerance and increased reliability. The slices can also be arranged to form multiple routers within the 5ESS® Switch.

The above has been a description of one preferred embodiment of Applicants' invention. Many other variations will be apparent to those of ordinary skill in the art without departing from the scope of the invention. The invention is thus limited only the attached claims.

What is claimed is:

1. A packet router comprising:

a plurality of router slices;

means for interconnecting said router slices;

wherein each of said router slices has incomplete routing information;

wherein said means for interconnecting said router slices comprises means for transmitting routing requests and routing response information among said router slices;

wherein each of said router slices comprises means for receiving, switching, and transmitting packets, wherein a router slice broadcasts a request for routing information to other router slices of said packet router when it has no routing information for routing a particular packet in its own memory; and in response to receipt of one or more routing information responses to and said request, routing said particular packet in accordance with said routing information responses.

2. The apparatus of claim 1, wherein said means for interconnecting said plurality of router slices comprises:

one or more time slot interchange units (TSI) wherein each such TSI is connected to a plurality of the router slices.

3. The apparatus of claim 2 wherein said means for interconnecting further comprises at least one communications module for interconnecting ones of said TSI units.

4. The apparatus of claim 3 wherein said communications module comprises a time multiplexed switch.

5. The apparatus of claim 1, wherein said means for interconnecting said packet slices comprises a plurality of buses, each bus interconnecting a pair of said packet slices.

6. The apparatus of claim 1, wherein said plurality of router slices is spread over more than one switching system.

7. The apparatus of claim 1, wherein each of said plurality of router slices comprise routing processor means, and wherein said routing processor means comprises a high speed processor having direct access to a routing database.

8. The apparatus of claim 1, wherein each router slice comprises an interface for communicating with a control processor for controlling a plurality of router slices.

* * * * *